United States Patent
Xu et al.

(10) Patent No.: US 10,126,614 B2
(45) Date of Patent: Nov. 13, 2018

(54) ARRAY SUBSTRATE, DISPLAY PANEL AND DISPLAY DEVICE

(71) Applicants: BOE Technology Group Co., Ltd., Beijing (CN); Ordos Yuansheng Optoelectronics Co., Ltd., Inner Mongolia (CN)

(72) Inventors: Jingyi Xu, Beijing (CN); Tianlei Shi, Beijing (CN); Kunpeng Zhang, Beijing (CN); Yezhou Fang, Beijing (CN); Yuelin Wang, Beijing (CN); Yanyan Zhao, Beijing (CN); Yafeng Gao, Beijing (CN); Yanwei Ren, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 15/661,919

(22) Filed: Jul. 27, 2017

(65) Prior Publication Data
US 2018/0059493 A1    Mar. 1, 2018

(30) Foreign Application Priority Data
Aug. 29, 2016  (CN) .......................... 2016 2 0979485

(51) Int. Cl.
G09F 13/04    (2006.01)
G02F 1/1362   (2006.01)
G02F 1/1335   (2006.01)
G02F 1/1333   (2006.01)

(52) U.S. Cl.
CPC .. *G02F 1/136204* (2013.01); *G02F 1/133512* (2013.01); *G02F 2001/133388* (2013.01); *G02F 2202/22* (2013.01); *G02F 2202/28* (2013.01)

(58) Field of Classification Search
USPC ........................................................... 362/97
See application file for complete search history.

(56) References Cited

U.S. PATENT DOCUMENTS

2014/0106684 A1* 4/2014 Burns ................... H01Q 1/243
                                                        455/78
2016/0063938 A1* 3/2016 Park ..................... C23C 14/042
                                                        345/92

* cited by examiner

*Primary Examiner* — Matthew Mikels
(74) *Attorney, Agent, or Firm* — Westman, Champlin & Koehler, P.A.

(57) ABSTRACT

An array substrate is disclosed. The array substrate includes: an underlying substrate, a light incident surface of the underlying substrate including a display region and a non-display region surrounding the display region; and a first conductive pattern arranged within the non-display region of the light incident surface of the underlying substrate. A display panel and a display device utilizing the array substrate are also disclosed.

14 Claims, 3 Drawing Sheets

ARRAY SUBSTRATE, DISPLAY PANEL AND DISPLAY DEVICE

CROSS-REFERENCE TO RELATED APPLICATION

This application claims the benefits of Chinese Patent Application No. 201620979485.8 filed on Aug. 29, 2016 in the State Intellectual Property Office of China, a whole disclosure of which is incorporated herein by reference.

TECHNICAL FIELD

Embodiments of the present disclosure relate to the field of manufacturing liquid crystal displays, and especially, to an array substrate, and a display panel and a display device having such array substrate.

BACKGROUND

A thin film transistor liquid crystal display (TFT-LCD) usually includes a liquid crystal panel, a backlight source and a driving circuit board, where the liquid crystal panel is formed by filling liquid crystals between an array substrate and a color filter substrate after they are assembled. Electrostatic discharge (ESD) may cause destructions and damages to components inside the liquid crystal panel. Destructions and damages caused by ESD may be divided into sudden destructions and potential damages. A Sudden destruction means that static electricity enters the liquid crystal panel and discharges, such that components are destroyed and cannot work properly. A potential damage means that ESD will generate electric field and electric current generating heat, which may cause damage to a component. Since ESD is very harmful to components inside the liquid crystal panel, it is very meaningful to learn how to protect a liquid crystal panel from being destructed and damaged by ESD.

In existing technologies, a side surface of an array substrate of a liquid crystal panel is provided with a flexible printed circuit (FPC), which may be connected to a ground (GND) wire, so that after entering the liquid crystal panel, ESD is transferred to the GND wire of the FPC via an internal wire of the liquid crystal panel, and the liquid crystal panel is thereby protected.

In existing technologies, however, the GND wire located at the side surface of the array substrate has a weak ability of receiving ESD, thus, the GND wire may not effectively reduce the damages caused by ESD.

SUMMARY

The present disclosure has been made to overcome or alleviate at least one aspect of the above mentioned disadvantages.

Accordingly, it is an object of the present disclosure to provide an array substrate.

According to an aspect of the present invention, there is provided an array substrate.

According to an exemplary embodiment of the array substrate, the array substrate may include: an underlying substrate, a light incident surface of the underlying substrate including a display region and a non-display region surrounding the display region; and a first conductive pattern arranged within the non-display region of the light incident surface of the underlying substrate.

According to another exemplary embodiment of the array substrate, the first conductive pattern may be made of a transparent electrically conductive material.

According to another exemplary embodiment of the array substrate, the array substrate may further include a second conductive pattern arranged within the display region of the light incident surface of the underlying substrate, and the second conductive pattern is made of a transparent electrically conductive material.

According to another exemplary embodiment of the array substrate, the first conductive pattern may be made of a non-transparent electrically conductive material.

According to another exemplary embodiment of the array substrate, at least one outer edge of the first conductive pattern may be provided with a sharp-ended structure having a sharp end pointing towards outside of the non-display region.

According to another exemplary embodiment of the array substrate, the non-display region may include a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

According to another aspect of the present disclosure, there is provided a display panel.

According to an exemplary embodiment of the display panel, the display panel may include an array substrate, and the array substrate includes: an underlying substrate, a light incident surface of the underlying substrate including a display region and a non-display region surrounding the display region; and a first conductive pattern arranged within the non-display region of the light incident surface of the underlying substrate.

According to another exemplary embodiment of the display panel, the first conductive pattern may be made of a transparent electrically conductive material.

According to another exemplary embodiment of the display panel, the array substrate may further include a second conductive pattern arranged within the display region of the light incident surface of the underlying substrate, and the second conductive pattern is made of a transparent electrically conductive material.

According to another exemplary embodiment of the display panel, the first conductive pattern may be made of a non-transparent electrically conductive material.

According to another exemplary embodiment of the display panel, at least one outer edge of the first conductive pattern may be provided with a sharp-ended structure having a sharp end pointing towards outside of the non-display region.

According to another exemplary embodiment of the display panel, the non-display region may include a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

According to a further aspect of the present disclosure, there is provided a display device.

According to an exemplary embodiment of the display device, the display device may include a backlight module and an array substrate, and the array substrate includes: an underlying substrate, a light incident surface of the underlying substrate including a display region and a non-display region surrounding the display region; and a first conductive pattern arranged within the non-display region of the light incident surface of the underlying substrate.

According to another exemplary embodiment of the display device, the first conductive pattern may be made of a transparent electrically conductive material.

According to another exemplary embodiment of the display device, the array substrate may further include a second conductive pattern arranged within the display region of the light incident surface of the underlying substrate, and the second conductive pattern is made of a transparent electrically conductive material.

According to another exemplary embodiment of the display device, the first conductive pattern may be made of a non-transparent electrically conductive material.

According to another exemplary embodiment of the display device, at least one outer edge of the first conductive pattern may be provided with a sharp-ended structure having a sharp end pointing towards outside of the non-display region.

According to another exemplary embodiment of the display device, the non-display region may include a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

According to another exemplary embodiment of the display device, the backlight module may be disposed at a light incident side of the array substrate, and the backlight module is provided therein with a ground wire electrically connected with the first conductive pattern.

According to another exemplary embodiment of the display device, the array substrate may further include a second conductive pattern arranged in the display region of the light incident surface of the underlying substrate, the second conductive pattern is made of a transparent electrically conductive material, and a polarizer is disposed on the display region of the underlying substrate. The backlight module includes: a plate-like component; the ground wire and a flexible printed circuit board connected with the ground wire arranged sequentially on a side of the plate-like component facing away from the array substrate; an annular light-shielding adhesive arranged on a side of the plate-like component adjacent to the array substrate, a via hole passing through the annular light-shielding adhesive and the plate-like component; and an electrically conductive material filled in the via hole, one end of the electrically conductive material being connected with the first conductive pattern, the other end of the electrically conductive material being connected with the ground wire.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS

Figure 1:
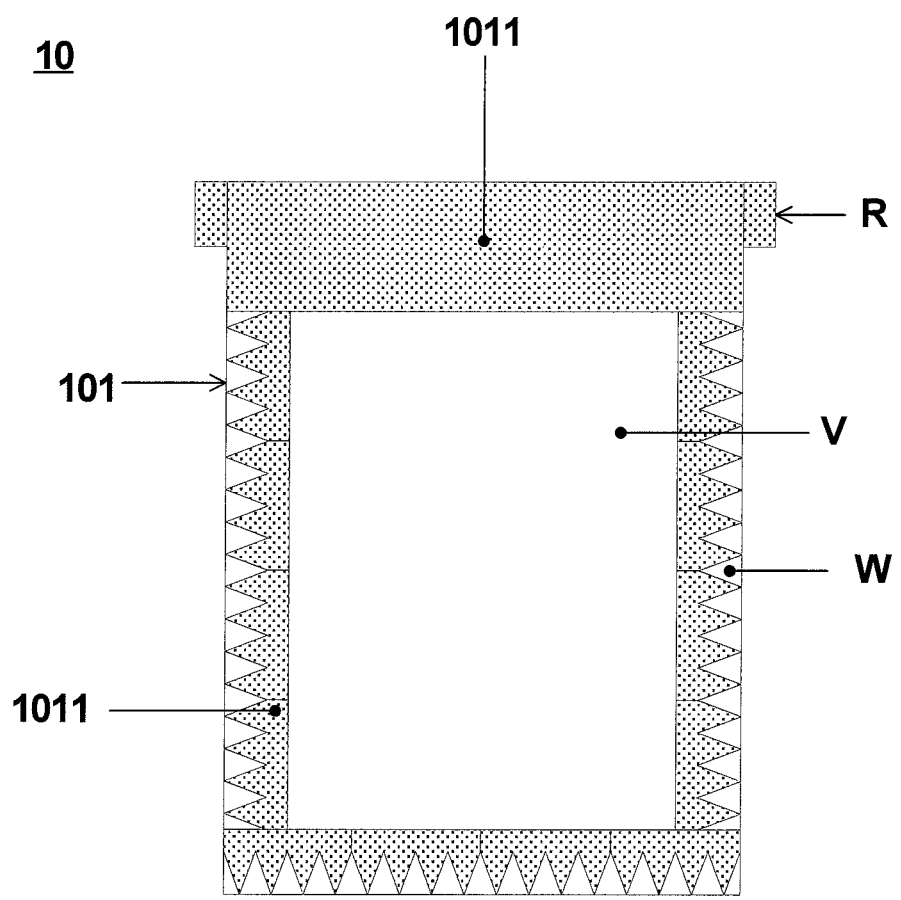
FIG. 1 is a schematic structure view showing an array substrate according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

FIG. 1 shows an array substrate 10 according to an embodiment of the present disclosure. The array substrate 10 includes an underlying substrate 101, and a light incident surface of the underlying substrate 101 includes a display region V and a non-display region W surrounding the display region. The display region usually corresponds to a view area (VA) of a color filter substrate, and the non-display region usually corresponds to a black matrix region surrounding the VA of the color filter substrate. The array substrate 10 further includes a first conductive pattern 1011 arranged within the non-display region W of the light incident surface of the underlying substrate 101.

In this embodiment, the first conductive pattern forms a circuit, which can effectively receive and guide ESD, such that damage to components inside the display panel due to the ESD directly entering the interior of the display panel can be reduced and thereby the display panel can be effectively protected.

To be noted, the light incident surface of the underlying substrate 101 refers to a surface of the underlying substrate 101 adjacent to a backlight module, through which light from the backlight module enters the underlying substrate 101.

In various embodiments, the first conductive pattern 1011 may be formed of a transparent electrically conductive material or a non-transparent electrically conductive material.

In an exemplary embodiment, the first conductive pattern 1011 may be formed in the non-display region W of the underlying substrate by using a mask through a magnetron sputtering process.

Figure 2:
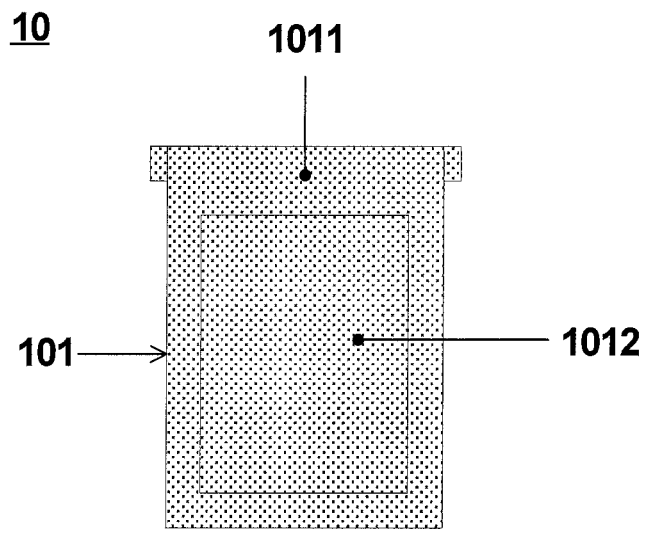
FIG. 2 is a schematic structure view showing an array substrate according to another embodiment of the present disclosure.

In an exemplary embodiment, the first conductive pattern 1011 is formed of a transparent electrically conductive material. In this embodiment, besides the first conductive pattern 1011 being arranged within the non-display region W of the underlying substrate, a transparent second conductive pattern 1012 may further be arranged within the display region V of the light incident surface of the underlying substrate 101, as shown in FIG. 2. Moreover, the first conductive pattern 1011 and the second conductive pattern 1012 may be formed of the same material and joined to each other such that a whole and integrated conductive pattern can be formed. In such case, the whole transparent conductive pattern may be formed through a magnetron sputtering process directly without using a mask, such that manufacturing process thereof can be simplified.

In another exemplary embodiment, the first conductive pattern 1011 is made of a non-transparent electrically conductive material. As shown in FIG. 1, the underlying substrate is only provided with the first conductive pattern 1011, and no other non-transparent conductive pattern is provided in the display region V. Because only the non-display region W of the light incident surface is provided with the first conductive pattern 1011 and the non-display region W aligns with the black matrix region of the color filter substrate, influence of the non-transparent electrically conductive material on light transmittance of the display panel will be avoided.

In an example, the transparent electrically conductive material may be indium tin oxide (ITO). ITO material may be formed on the light incident surface of the underlying substrate through a magnetron sputtering process to form the transparent conductive pattern before or after the array substrate and the color filter substrate are assembled together. In other examples, the conductive pattern may also be formed of another transparent electrically conductive material through another process.

In an exemplary embodiment of the present disclosure, as shown in FIG. 1, at least one outer edge of the first conductive pattern 1011 is provided with a sharp-ended structure facing toward outside of the non-display region. In an alternative embodiment, as shown in FIG. 2, in the case of the light incident surface of the underlying substrate 101 is provided with a whole layer of transparent conductive pattern, the outer edge of the first conductive pattern 1011 within the non-display region W may not be provided with any sharp-ended structure.

With the sharp-ended structure being provided at at least one edge of the first conductive pattern 1011, as shown in FIG. 1, the first conductive pattern may more effectively receive and guide ESD and prevent ESD from entering the internal of the display panel according to the principle of point discharge such that display panel is protected. Preferably, the sharp-ended structure may have a triangular shape. In a preferable embodiment, the sharp end of the triangular shape pointing outwardly has an angle equal to or less than 90 degrees.

Optionally, the non-display region W may include a data lead wire region R, which is a region where an orthographic projection of a data line disposed on the array substrate onto the underlying substrate 101 lies, and the first conductive pattern covers the data lead wire region R, as shown in FIG. 1. In an embodiment, outer edges of the first conductive pattern 1011, except a part of an outer edge corresponding to the data lead wire region R, may be provided with a plurality of sharp-ended structures that are disposed continuously, and the first conductive pattern 1011 is an axial symmetric pattern.

To be noted, providing the first conductive pattern 1011 at a side of the data lead wire region R adjacent to the backlight module may increase the strength of the data lead wire region R, so that a display panel or a display device utilizing such array substrate may have an improved ability to pass tests, such as drop test.

In summary, the present disclosure has provided an array substrate comprising an underlying substrate whose light incident surface is provided with a first conductive pattern in a non-display region, and the first conductive pattern forms a part of a circuit for receiving and guiding ESD. Therefore, the array substrate can effectively receive and guide ESD, such that damage to components inside the display panel due to ESD directly entering the interior of the display panel can be reduced and thereby the display panel can be effectively protected.

According to another aspect of the present disclosure, there is provided a display panel, which includes the array substrate 10 according to the embodiment shown in FIG. 1 or 2.

Figure 3:
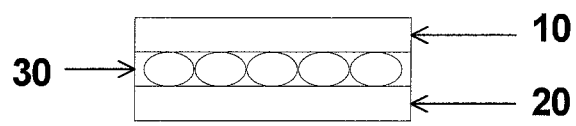
FIG. 3 is a schematic structure view showing a display panel according to an embodiment of the present disclosure.

According to an exemplary embodiment, the display panel may includes the array substrate 10, a color filter substrate 20 and a liquid crystal layer 30 arranged between the array substrate 10 and the color filter substrate 20, as shown in FIG. 3.

Figure 4:
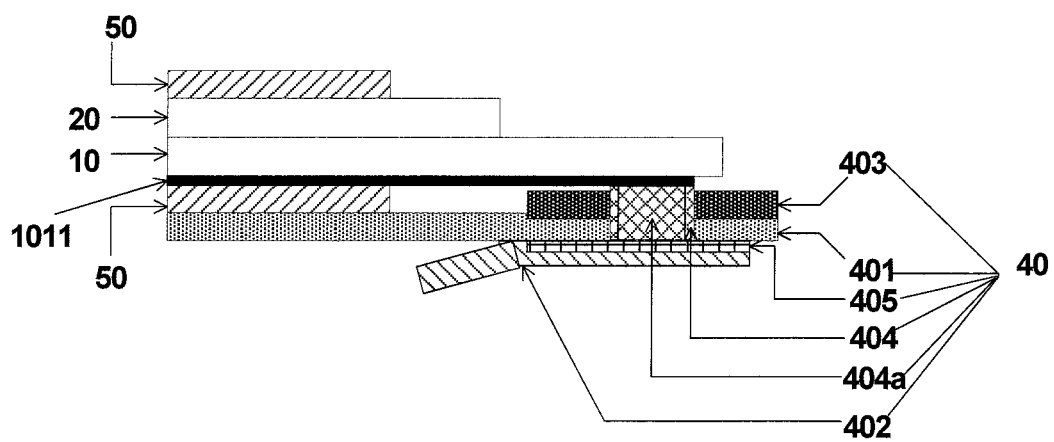
FIG. 4 is a schematic structure view showing a display device according to an embodiment of the present disclosure.

According to a further aspect of the present disclosure, as shown in FIG. 4, there is provided a display device, which includes: a backlight module 40 and the array substrate 10 according to the embodiment shown in FIG. 1 or 2.

As shown in FIG. 4, the backlight module 40 is disposed at a light incoming side of the array substrate 10, and the backlight module 40 is provided with a ground wire electrically connected with the first conductive pattern 1011. The display region V of the underlying substrate 101 provided with the first conductive pattern 1011 is further provided therein with a polarizer 50.

In an exemplary embodiment, the backlight module 40 includes a plate-shaped component 401, as shown in FIG. 4. A side of the plate-shaped component 401 facing away from the array substrate 10 is provided thereon with a ground wire and a grounded flexible printed circuit FPC 402. To be noted, the plate-shaped component 401 is made of an organic resin material having an insulation property.

A side of the plate-shaped component 401 adjacent to the array substrate 10 is provided thereon with annular light-shielding adhesive 403, and a via hole 404 passes through the annular light-shielding adhesive 403 and the plate-shaped component 401. The via hole 404 passing through the annular light-shielding adhesive 403 and the plate-shaped component 401 may be formed through a mask etching process, a laser drilling process or other processes.

The via hole 404 is filled with an electrically conductive material 404a, one end of the electrically conductive material 404a is connected with the first conductive pattern 1011, and the other end thereof is connected with the ground wire. Optionally, the electrically conductive material 404a may be electrically conductive double-sided adhesive.

Figure 5:
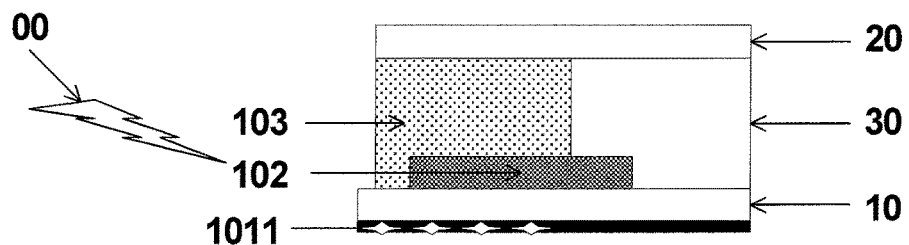
FIG. 5 is a schematic drawing showing a principle of electrostatic protection of display device according to an embodiment of the present disclosure.

Further, a gate driver on array (GOA) circuit 102 and a sealant 103 are arranged sequentially on a portion of a light exit surface of underlying substrate 101 corresponding to the non-display region W of the light incident surface shown in FIG. 1. Side surfaces of the GOA circuit 102 and the sealant 103 forms a step-like structure, as shown in FIG. 5. To be noted, the light exit surface of the underlying substrate 101 is a surface of the underlying substrate 101 facing away from the backlight module. When an electrostatic gun 00 is discharging, the first conductive pattern 1011 will attract ESD into the first conductive pattern 1011 on the light incident surface of the underlying substrate 101, such that the GOA circuit 102 is protected.

Figure 6:
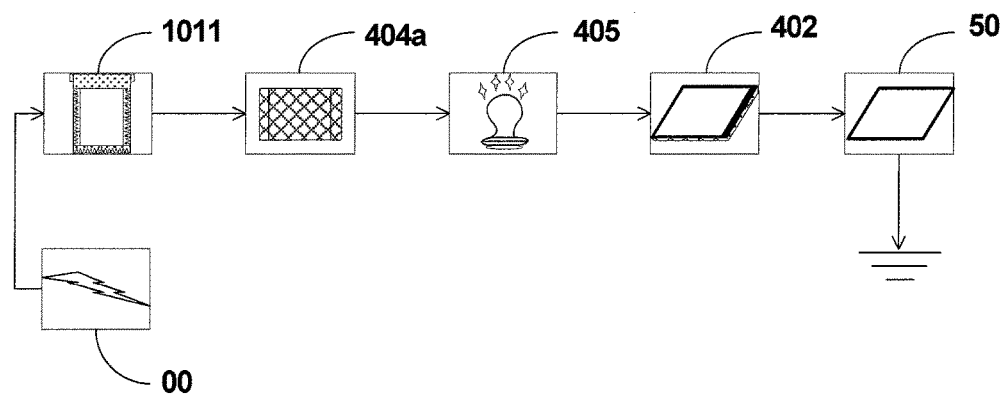
FIG. 6 is a schematic drawing showing an electro-static discharge path in a display device according to an embodiment of the present disclosure.

When an ESD reliability test is performed (the ESD reliability test is performed to ensure that the display device has an electrostatic protection function), the electrostatic gun 00 shown in FIG. 5 discharges towards the display device, and a discharge path is shown in FIG. 6. The ESD is firstly attracted by the first conductive pattern 1011, then enters a grounded circuit formed partially by the first conductive pattern 1011 on the light incident surface of the underlying substrate 101, then passes through the electrically conductive material 404a filled in the via hole 404 passing through the annular light-shielding adhesive 403 and the plate-like component 401 to a ground wire on a FPC 405 of a light emitting diode in the backlight module 40. The ground wire on the FPC 405 of the light emitting diode is electrically connected with the ground wire on the FPC 402 of the backlight module 40, thus the ESD is transmitted to the ground wire on the FPC of the backlight module 40, which is electrically connected with a ground wire of a main FPC 50 of the display device, so that the ESD is transmitted to the ground and discharge process of the ESD is accomplished.

In summary, in the display device provided according the embodiments of the present disclosure, the first conductive pattern is connected with the ground wire of the backlight module by the electrically conductive material filled in the via hole formed in the plate-like component, such that electricity guided by the first conductive pattern can be effectively transferred out of the display panel to the backlight module and then to the ground, and components inside of the display panel can be well protected.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An array substrate, comprising:
    an underlying substrate, a light incident surface of the underlying substrate including a display region and a non-display region surrounding the display region; and
    a first conductive pattern arranged within the non-display region of the light incident surface of the underlying substrate,
    wherein at least one outer edge of the first conductive pattern is provided with a sharp-ended structure having a sharp end pointing towards outside of the non-display region,
    wherein the non-display region comprises a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

2. The array substrate according to claim 1, wherein the first conductive pattern is made of a transparent electrically conductive material.

3. The array substrate according to claim 2, wherein the array substrate further comprises a second conductive pattern arranged within the display region of the light incident surface of the underlying substrate, and the second conductive pattern is made of a transparent electrically conductive material.

4. The array substrate according to claim 1, wherein the first conductive pattern is made of a non-transparent electrically conductive material.

5. A display panel, comprising an array substrate, the array substrate comprising:
    an underlying substrate, a light incident surface of the underlying substrate including a display region and a non-display region surrounding the display region; and
    a first conductive pattern arranged within the non-display region of the light incident surface of the underlying substrate,
    wherein at least one outer edge of the first conductive pattern is provided with a sharp-ended structure having a sharp end pointing towards outside of the non-display region,
    wherein the non-display region comprises a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

6. The display panel according to claim 5, wherein the first conductive pattern is made of a transparent electrically conductive material.

7. The display panel according to claim 6, wherein the array substrate further comprises a second conductive pattern arranged within the display region of the light incident surface of the underlying substrate, and the second conductive pattern is made of a transparent electrically conductive material.

8. The display panel according to claim 5, wherein the first conductive pattern is made of a non-transparent electrically conductive material.

9. A display device, comprising a backlight module and an array substrate, the array substrate comprising:
    an underlying substrate, a light incident surface of the underlying substrate including a display region and a non-display region surrounding the display region; and
    a first conductive pattern arranged within the non-display region of the light incident surface of the underlying substrate,
    wherein at least one outer edge of the first conductive pattern is provided with a sharp-ended structure having a sharp end pointing towards outside of the non-display region,
    wherein the non-display region comprises a data lead wire region, the outer edge of the first conductive pattern, except a part of the outer edge corresponding to the data lead wire region, is provided with a plurality of sharp-ended structures that are arranged continuously, and the first conductive pattern is an axial symmetric pattern.

10. The display device according to claim 9, wherein the first conductive pattern is made of a transparent electrically conductive material.

11. The display device according to claim 10, wherein the array substrate further comprises a second conductive pattern arranged within the display region of the light incident surface of the underlying substrate, and the second conductive pattern is made of a transparent electrically conductive material.

12. The display device according to claim 9, wherein the first conductive pattern is made of a non-transparent electrically conductive material.

13. The display device according to claim 9, wherein the backlight module is disposed at a light incident side of the array substrate, and the backlight module is provided therein with a ground wire electrically connected with the first conductive pattern.

14. The display device according to claim 13, wherein the array substrate further comprises a second conductive pattern arranged in the display region of the light incident surface of the underlying substrate, the second conductive pattern is made of a transparent electrically conductive material, and a polarizer is disposed on the display region of the underlying substrate;
    and wherein the backlight module comprises:
    a plate-like component;

the ground wire and a flexible printed circuit board connected with the ground wire arranged sequentially on a side of the plate-like component facing away from the array substrate;

an annular light-shielding adhesive arranged on a side of the plate-like component adjacent to the array substrate, a via hole passing through the annular light-shielding adhesive and the plate-like component; and an electrically conductive material filled in the via hole, one end of the electrically conductive material being connected with the first conductive pattern, the other end of the electrically conductive material being connected with the ground wire.

* * * * *